Patented Mar. 9, 1954

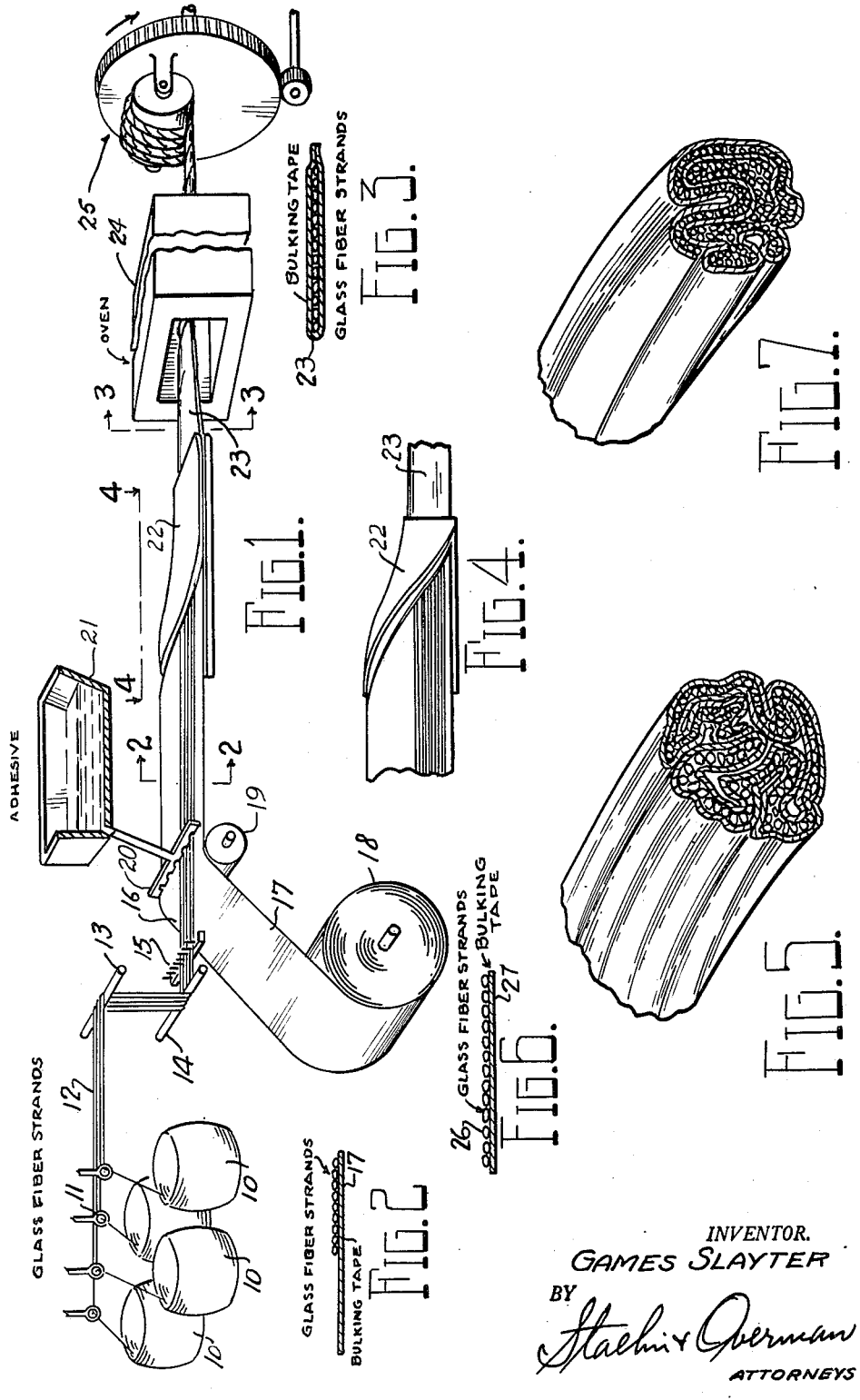

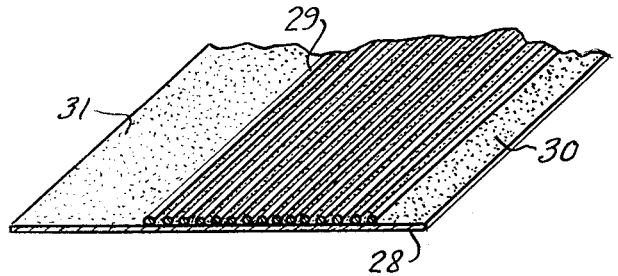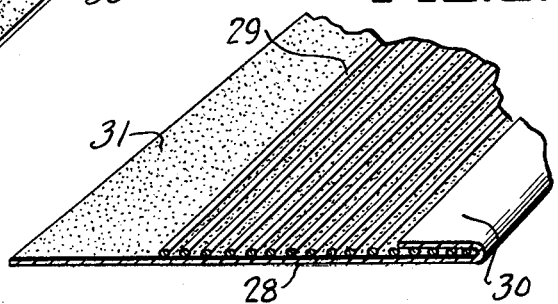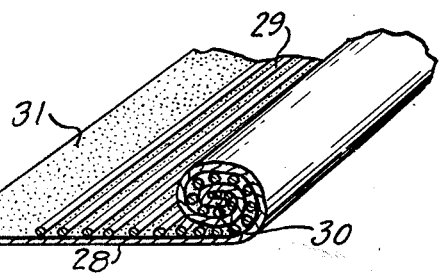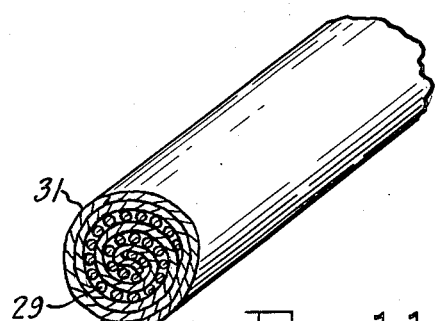

2,671,306

UNITED STATES PATENT OFFICE 2,671,306

GLASS FIBER TWINE AND METHOD OF MAKING THE SAME

Games Slayter, Newark, Ohio, assignor to Owens-Corning Fiberglas Corporation, a corporation of Delaware Application April 12, 1951, Serial No. 220,628

11 Claims. (Cl. 57—140)

This invention relates to the art of manufacturing strong, tough twines such as those used in baling and binding machinery, for example, hay balers, bundle binders, newspaper bundlers, etc., and more particularly to a method for the fabrication of a glass fiber twine having a strip bulking agent incorporated in its structure.

While glass fibers have very high tensile strengths, say in the order of 400,000 pounds per square inch, and while relatively small numbers of glass fibers can be associated together to make a twine with great tensile strength, the nature of glass fibers is such that certain disadvantageous characteristics exist in a twine made solely from glass fibers. A successful twine must not only have high tensile strength but it must also have relatively high knot strength. Knot strength involves not only tensile strength but also whether or not the material from which it is fabricated can be tied in tight knots without fracturing or fraying and whether or not the material has a tendency to abrade itself. Unfortunately, glass is very abrasive on itself and, therefore, when unprotected glass fibers are tied in knots the relationship between the total tensile strength of the fibers and their knot strength is poor. Furthermore, since only a relatively small number of the glass fibers are necessary to compose a twine of great strength, the radii through which the individual fibers are bent in a tight knot may be so small that the glass fibers may fracture, further lowering the knot strength of the twine.

The principal object of this invention is to bulk glass fiber strands to form a strong, tough twine which has much greater size than that possible merely through the use of the glass fibers.

It is a further object of this invention to provide an apparatus for the fabrication of strong, tough twine employing a continuous, dry, easily handleable form of supplementary fibers not possessing in themselves any great tensile strength but serving merely to space the very strong glass fibers from each other and to make the resulting twine larger in size for the same number of fibers and the same tensile strengths thereby greatly increasing the knot strengths by overcoming the inherent adverse characteristics of glass fibers alone.

It is a further object of this invention to provide a method for the enclosing of grouped strands of glass fibers with a protective strip or web of inexpensive, low tensile strength fibers such as, for example, paper or similar weak, though unitary masses of fibers.

Yet another object of this invention is the provision of a strong, tough twine having associated masses of glass fibers for tensile strength and having a web or strip of paper or paper-like material inter-twisted with the glass fibers for protecting the glass fibers from each other and for bulking the twine to increase the knot size and the knot strength.

These and more specific objects and advantages will be apparent from the reference to the specification which follows and to the drawings, in which:

Fig. 1 is a diagrammatical illustration, partly in perspective, of apparatus on which the process of the instant invention may be carried out for the fabrication of twine according to the instant invention.

Fig. 2 is a greatly enlarged vertical sectional view taken on the line 2—2 of Fig. 1 and showing a mass of oriented glass fibers and strands as they appear after a certain step in the method.

Fig. 3 is a view similar to Fig. 2 but taken on the line 3—3 of Fig. 1 and showing an orientated group of glass fiber strands combined with a bulking fiber tape.

Fig. 4 is a fragmentary plan view taken on the line 4—4 of Fig. 1.

Fig. 5 is a fragmentary isometric view showing the fibers and bulking tape twisted to form a twine.

Fig. 6 is a view similar to Fig. 3 but showing a modification of the structure.

Fig. 7 is a view similar to Fig. 5 but of the form of twine fabricated from the ribbon shown in Fig. 6.

Fig. 8 is a fragmentary isometric view showing the first step in the preparation of a modified form of twine.

Fig. 9 is a view similar to Fig. 8 and illustrating the next successive step.

Fig. 10 is a view similar to Figs. 8 and 9 and showing a third step in the production of the modified form of twine.

Fig. 11 is a view similar to Figs. 5 and 7 but showing the twine produced by the method illustrated in Figs. 8, 9 and 10.

The manufacture of strong, tough twine in accordance with the instant invention utilizes glass fibers in the form of balls or spools of coated glass fiber strands. Each strand of the glass fibers, as it is manufactured, may consist of 200 or more individual fibers of very fine diameter. A strand usually is wound as a unit on a ball such as the balls 10 shown in Fig. 1. A sufficient number of balls 10 or similar supply of continuous strands of glass fibers are assembled and each of the strands or groups of strands is led, preferably from the interior of the spool through a feeding eye 11 and associated with other strands into a ribbon-like group 12. The ribbon of strands is led over rods 13 and 14 to equalize the tension and then through a comb 15 for spacing.

When glass fibers are fabricated, each fiber making up each strand may be coated with one of several types of sizing or lubricating materials, such as the conventional mixture of starch or gum and oil, in order to protect the fiber surface and to separate it from its neighbors. If the coated glass fiber strands are fabricated purposely for the manufacture of twine in accordance with the instant invention, each strand or group of fibers may be further coated with, for example, a synthetic resinous adhesive such as a phenol-formaldehyde, urea-formaldehyde, vinyl resin or any one of numerous other types of natural or synthetic resins and adhesives which is placed on the strands in such a condition that upon the application of heat and/or pressure the material may fuse slightly, adhering the fibers and strands tightly to each other. Thermoplastic resins may advantageously be used since they can be heated and reheated and will fuse and set depending entirely upon their temperature.

After the strands are associated and led through the comb 15, what is until then a generally loosely grouped mass of glass fiber strands is formed into an orientated flat ribbon 16 which is led into contact with the upper surface of a tape 17, fed from a supply roll 18, the tape 17 preferably being at least twice as wide as the ribbon 16. At the junction point of the tape 17 and ribbon 16, a roller 19 serves as a support and a drip nozzle 20 may be provided to spread a coating of adhesive from a supply tank 21 over the surfaces of the tape 17 and ribbon 16 of strands.

The adhesive may be used in addition to that already on the strands 12 or it may be used in place of such adhesive. In either event, the tape 17 or its overlay of strands 16 should be coated with sufficient adhesive to bond the strands to the tape and to hold the tape together.

The selection of the particular adhesive employed for adhering the strands to the paper or other ribbon, or where it is placed on the fibers directly, depends not only on its tenacity to glass, but on its conditions in the range of temperatures likely to be encountered in use of the finished twine. It should retain its flexibility at temperatures at least as low as those in the order of freezing (32° F.) and should not become liquid or too tacky at temperatures in the order of those to which the twine may be raised by high speed handling on hot summer days (say 140° F.). Adhesives which advantageously may be employed for this purpose include high softening point asphalt, butadiene acrylo-nitrile copolymers, butadiene-styrene copolymers, mixtures thereof, polyvinyl acetates, natural or synthetic rubber latexes or other similar paper adhering materials.

The tape 17 may be made of any type of fibrous material such as paper, cloth or cellulose fibers or other organic or inorganic fibers, it being necessary only that the material forming the tape 17 shall have sufficient strength to remain integral during its feeding into engagement with and around the glass fibers and during the subsequent formation of twine. The material should also be tough enough that it is not too easily torn or frayed. I have found that thin, tough paper of the type known as "kraft paper" is excellent for this use, for example. The material may be any of those mentioned or others and its particular characteristics may determine the type of adhesive with which the glass fiber strands are coated or which is applied by the nozzle 20 since the adhesive must have an appropriate affinity for the material making up the tape 17 as well as for the strands in the ribbon 16.

Fig. 2 is an enlarged cross sectional view showing how the glass fiber strands are orientated into parallelism on the surface of the tape and laid as a warp on only approximately one-half of the width of the tape.

After the tape 17 with the one-half width ribbon 16 of strands laid thereon leaves the area where the adhesive may be sprayed on its surface, it passes through a folding shoe 22 which turns one-half of the tape 17 over and presses it down on the ribbon 16 of strands, adhering the tape to itself as shown in Fig. 3 and forming a multilayer ribbon 23.

The ribbon 23 then passes through a steam chamber 24 where the heat softens the adhesive and the moisture softens the fibers of the tape 17. The structure then is led to a twisting and balling machine 25 which is operated at a speed selected to twist the flat ribbon 23 into the finished cord.

The amount of the twist put into the twine structure depends, of course, upon the respective speeds of feeding of the twine and the speed of the twisting mechanism 25 and is controlled so as to overlap the edges of the web in the manner shown in Fig. 4. The number of turns per linear inch or foot preferably is kept relatively low to retain as much of the tensile strength of the glass as possible, but must, on the other hand, be sufficiently high to give the finished twine flexibility. I have found that from one-half to one turn per inch is excellent.

In the final twine, the strands of glass fibers provide the tensile strength necessary in the twine and the bulking material appropriately separates them from each other to reduce the abrasive effect of the glass on itself and to bulk up the twine so as to enlarge the radii through which the fibers are bent when the twine is knotted. The twist put into the twine by the twisting machine or by other similar twisting mechanism is retained in the twine by the setting up of the adhesive material carried onto the twine either by the glass fiber strands themselves or by the bulking tape. The adhesive must, therefore, have considerable stiffness and strength when set up so as to prevent the "wild" untwisting of the finished twine or the fraying of an end which is cut.

Figs. 6 and 7 illustrate a modification of the method for fabricating the twine and the twine constituting the instant invention. This modification comprises the changes necessary to produce a twine wherein the bulking tape is laid on only one side of the ribbon-like mass of continuous glass fibers. In this modification of the invention a ribbon-like mass of strands 26 may be arranged in the manner described above with respect to Fig. 1 and associated with a flat bulking tape 27. The bulking tape 27 is shown in Fig. 6 as being laid against the underside of the ribbon of glass fiber strands 26 but it could equally well be placed over or on top of the ribbon of strands 26. In this modification the bulking tape 27 is substantially the same width as the ribbon of strands 26. After the tape 27 is adhered to the ribbon of glass fiber strands 26 the structure has the appearance in cross section as shown in Fig. 6 and it is then put through the remaining steps of the process as illustrated in Fig. 1. The twisted twine in this instance has the appearance shown in Fig. 7 and it is similar in its characteristics to the twine constructed by the modification of the invention described in connection with Fig. 1 and illustrated in Fig. 5, the principal difference being the reduced amount of bulking fiber relative to the glass fibers in the finished twine.

Conversely, by increasing the number of strands of glass fibers employed and by laying them on the bulking tape in a multiple layer, i. e., in a ribbon two or more strands thick, instead of in a single layer as shown, the percentage of glass to bulking fiber may be further varied and the total number of strands of glass fibers greatly increased.

In determining the number of strands of glass fibers to be employed and in selecting the thickness of the ribbon of glass fiber strands to be laid on the bulking tape, a further consideration must be observed. Because of the abrading effect of the glass fiber strands on each other it is desirable that as few glass fiber strands shall contact each other in the body of the twine as possible. For example, the form of twine as illustrated in Fig. 5 very effectively "insulates" each glass fiber strand from those in other layers of the ribbon.

Although in the drawings and the previous description the glass fiber strands are shown as lying adjacent each other, this condition is not entirely correct because in actuality the strands may be spaced laterally from each other in order to further reduce the contacts between strands. In many instances the proportionate amount of glass to bulking tape is far smaller than that shown in Figs. 5 and 6 where the glass fiber strands are shown as having substantially greater diameter relative to the thickness and width of the bulking tape than actually is true, for purposes of illustration. The lateral spacing between the strands thus serves to further separate the strands from each other and to space the strands out over the entire surface of the paper. In most cases the number of strands necessary to give the twine the desired strength results in a number of glass fiber strands so small as to not extend over the entire surface of the bulking tape or, if spread sufficiently to cover its entire surface, substantial spaces, often several times greater than the diameter of an individual strand, are left between adjacent strands.

In the modified form of twine shown in Fig. 7 a larger number of glass fiber strands contact each other in some of the convolutions of the twine. Preferably, this contact between glass fiber strands, each of which is adhered to a different fold of the bulking tape, should be kept at a minimum.

Another form of twine constructed by slightly varying the process already described and resulting in a further modification is that illustrated in Figs. 8 through 11 of the drawings. In this form of construction the twine is prepared by what might be termed "rolling" as contrasted to "twisting." A strip of bulking tape or fiber 28 is coated with an adhesive in the manner already described and a ribbon-like group of spaced parallel glass fiber strands 29 is laid on the tape 28 leaving a narrow adhesive coated margin 30 on one side and a wider adhesive coated margin 31 at the other side of the tape 28. The tape 28 and ribbon 29 are then fed through a forming shoe (not shown) in which the narrow margin 30 is folded inwardly over the edge of the ribbon of strands 29 as shown in Fig. 9. The doubled over edge 30 is then rolled inwardly on itself and the remaining portion of the tape 28 rolled around the structure as it is formed in the manner shown in Fig. 10.

The finished twine has a general appearance such as that shown in Fig. 11 where it should be noted that the wider margin 31 is of sufficient width to form an outer layer of unre-enforced tape. This serves as an additional protection of the body of the twine against scuffing and abrading in use keeping two layers of the bulking tape outside of the first layer of glass fiber strands. The spiral layers precisely space each of the strands of the glass fiber from the strands of glass fibers in inner or outer layers. By spacing the glass fibers in the ribbon 29 laterally from each other when they are placed on the re-enforcing tape the same lateral spacing continues to exist in the rolled twine in Fig. 11 and each glass fiber strand maintains its separate integrity being almost entirely free of abrasion with respect to its neighbors.

It may be desirable in some cases to continue folding the tape after the step illustrated in Fig. 9 to produce a tape having a generally flattened oval in cross section as contrasted with the generally circular exterior of the twine shown in Fig. 11.

In the case, particularly, of the double enfolded ribbon 23 shown in Fig. 3, it may be advantageous to merely pull the flat ribbon through a generally circular crimping die which crimps the ribbon inwardly on itself. In this instance the cross section of the twine might be very similar to that shown in Fig. 5 but the entire body of the twine would not necessarily be twisted. If the bulking tape were of sufficient strength to retain the crimped form by itself or if the adhesive with which the glass fiber strands are adhered to the bulking tape is of a tough thermoplastic variety, pulling the ribbon through an appropriate crimping die would produce a twine quite similar to that produced by the twisting step. The twine of Fig. 6 might also be crimped together, but preferably should be at least rolled into a loop with the bulking tape on the exterior before it is crimped.

Twines constructed in accordance with the invention have been found to possess substantially the same characteristics as natural fiber twines for which they are a replacement. The bulking material gives to the lesser quantity of glass fibers employed for twines of the same strength, a size and knotting characteristic highly similar to that of the natural fiber twines and, particularly in the forms where care is exercised to keep the bulking tape always on the exterior of the structure and to carefully space the glass fiber strands laterally from each other, the bulking material also protects the glass fiber strands from scuffing and exterior abrasion.

I claim:

1. A method for the manufacture of tough twine that comprises assembling a mass of glass fiber strands into longitudinally generally parallel ribbon-like relationship, assembling a continuous, fibrous bulking tape with the strands, adhering the mass of strands and tape to each other with a margin of tape at each side of the strands and rolling the adhered structure laterally with one margin of the tape forming an exterior layer on the finished twine.

2. A method for the manufacture of tough twine that comprises assembling a quantity of individual glass fiber strands into longitudinally orientated, substantially parallel, ribbon-like relationship, associating a fibrous bulking tape with said orientated glass fiber strands and parallel to the major plane thereof, adhering said glass fiber strands to said bulking tape to form a generally ribbon-like structure and laterally compressing said ribbon-like structure to form a twine with said glass fiber strands generally interspersed throughout the body of said twine and layers thereof spaced by layers of said bulking tape.

3. A method in accordance with claim 2 in which the ribbon-like structure is crimped inwardly upon itself forming convoluted generally alternate layers of glass fiber strands and bulking tape throughout the body of the twine.

4. A tough twine consisting in a plurality of continuous glass fiber strands, a ribbon-like bulking tape extending generally through the body of the twine in convolutions located between and spacing layers of said glass fiber strands from each other and an adhesive matrix bonding said strands and said tape into an integral unit.

5. A tough twine consisting in a ribbon-like bulking tape, a plurality of continuous glass fiber strands adhered to one surface of said tape in laterally spaced relationship and bonded thereto by an adhesive, the tape and the glass fiber strands being rolled laterally into a spiral structure, there being at least one complete layer of tape exteriorly of the outermost layer of glass fiber strands and the glass fiber strands extending generally throughout the body of the tape.

6. An adhesive bonded, paper-glass strand twine comprising a plurality of spaced, spirally parallel glass strands adhered to a web of paper by, and embedded in, an adhesive matrix, said web spiralling with and located exteriorly of said strands.

7. An adhesive bonded paper-glass twine comprising a plurality of parallelly extending, individually spaced glass fiber strands adhered to at least one side of a paper web that is laterally compacted upon itself into generally circular cross section.

8. An adhesive bonded paper-glass twine comprising a plurality of parallelly extending, individually spaced glass fiber strands embedded in and adhered by adhesive to at least the inner side of a paper web that is twisted upon its longitudinal axis into generally circular cross section.

9. An adhesive bonded paper-glass twine comprising a plurality of parallelly extending, individually spaced glass fiber strands embedded in and adhered by adhesive to at least one side of a paper web that is twisted upon its longitudinal axis into generally circular cross section with said paper web exterior of said strands.

10. A method for the manufacture of twine that comprises assembling and orienting a mass of glass fiber strands into spaced, longitudinally parallel, ribbon-like relationship, coating substantially all of one face of a thin paper web not less than the width of said ribbon-like mass of strands with an adhesive, laying said ribbon-like mass of strands on the adhesive coated face of said web, and laterally compacting these components into generally circular cross section with said web exteriorly of said strands.

11. A method for the manufacture of twine that comprises assembling and orienting a mass of glass fiber strands into spaced, longitudinally parallel, ribbon-like relationship, coating substantially all of one face of a thin paper web of a width not substantially greater than that of said ribbon-like mass of strands with an adhesive, laying said ribbon-like mass of strands on the adhesive coated face of said web, and twisting these components on a generally central, longitudinal axis with said web convoluted with said strands throughout the resulting structure and lying exteriorly of said strands.

GAMES SLAYTER.

References Cited in the file of this patent

UNITED STATES PATENTS

| Number | Name | Date |
|---|---|---|
| 2,176,019 | Cohoe | Oct. 10, 1939 |
| 2,293,246 | Fay | Aug. 18, 1942 |
| 2,523,022 | Harstman | Sept. 19, 1950 |
| 2,604,424 | Mathes | July 22, 1952 |